J. PURING.
MATHEMATICAL INSTRUMENT.
APPLICATION FILED MAY 10, 1916.
1,346,250.
Patented July 13, 1920.
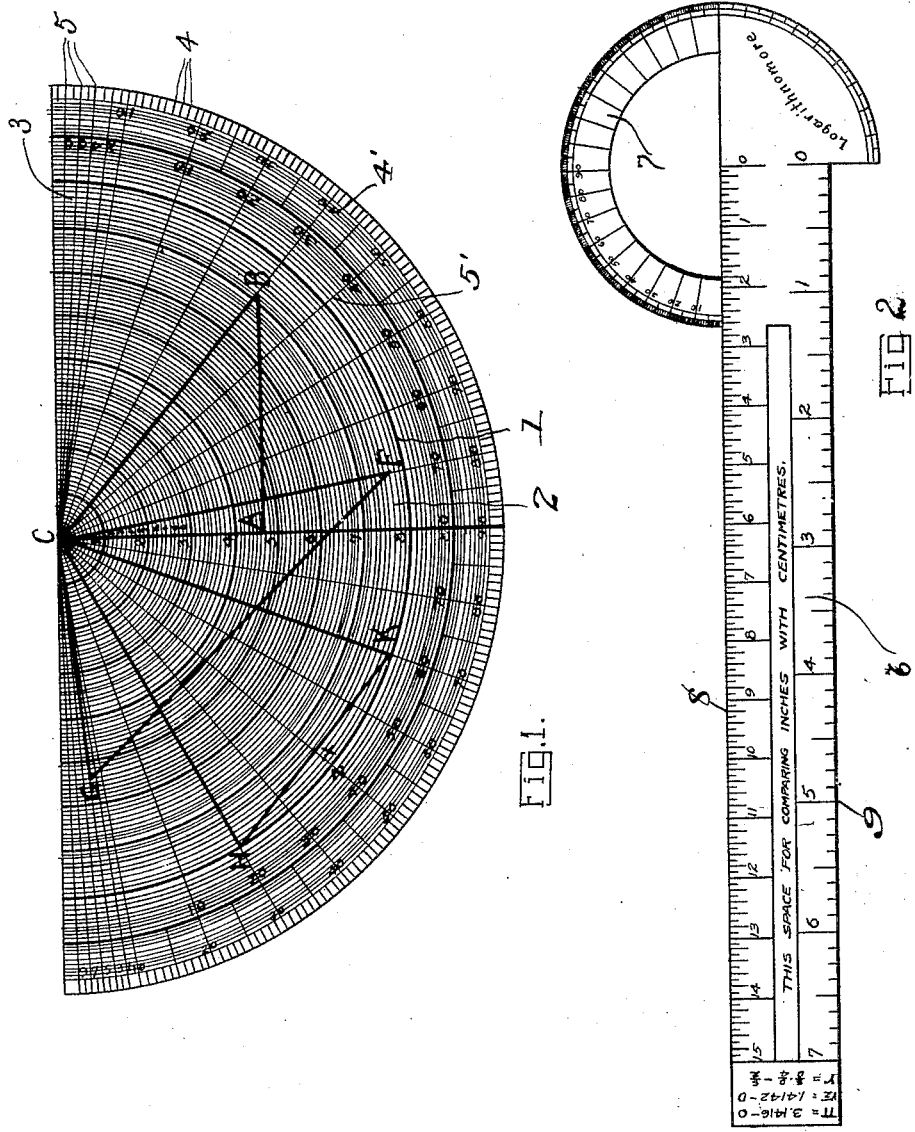

UNITED STATES PATENT OFFICE.

JOHN PURING, OF NEW YORK, N. Y.

MATHEMATICAL INSTRUMENT.

1,346,250.  Specification of Letters Patent.  Patented July 13, 1920.

Application filed May 10, 1916. Serial No. 96,548.

*To all whom it may concern:*

Be it known that I, JOHN PURING, a subject of the Czar of Russia, and resident of New York, in the county of New York and State of New York, have invented certain new and useful Improvements in Mathematical Instruments, of which the following is a specification.

My invention relates to mathematical instruments and it comprises a protractor with the usual divisions indicating the degrees, certain of said divisions being connected with the center of the instrument by lines forming radii, a plurality of arcs being formed on the protractor parallel to the outer edge and equally spaced from each other dividing the radii into units, and the protractor being further provided with a second series of arcs equally spaced from each other and dividing the spaces between each pair of the first mentioned arcs into suitable subdivisions; and a rule, which is advantageously of a length equal to the diameter of the protractor, the rule being divided into units and subdivisions equal in size to the units and subdivisions formed on the radii of the protractor, and being provided with a second protractor at one end; all as more fully hereinafter set forth and as claimed.

In the computation of unknown geometrical quantities of a given polygon, the usual method is to employ certain formulæ and to calculate the unknown sides and angles by the use of these formulæ and the given quantities of the polygons. Of course these rules, formulæ and other data are well-known to mathematicians, engineers, and the like, but, even then, it is necessary to calculate to secure the desired information and there is always the possibility of errors in calculating. With the present invention, the unknown quantities of a triangle may be determined without the use of any given formulæ or rules, and without requiring the use of calculation.

In the present invention, given certain data, such as the length of two sides of a triangle and the size of the angle formed by the intersection of the two sides, the sides may be plotted on the protractor at the proper angle and the length of the third side determined with the rule forming a part of this invention. At the same time one angle may be measured by the protractor formed on the rule and the other angle may be then ascertained by measuring or subtracting the sum of the two angles known from 180°.

In the accompanying drawings I have shown an advantageous embodiment of this invention.

Figure 1 is a face view of the protractor; and

Fig 2 is a similar view of the rule.

The protractor 3 is, in this instance, semicircular and is divided into 180° as indicated at 4 The radii 4' connect every tenth degree with the center C of the protractor. The ten degrees at each edge of the protractor are provided with radii 5 connecting each alternate degree with the center, the radii upon one side passing through the indications of even number and those on the opposite side connecting the odd degrees with the center. This permits laying off of angles of a size not a multiple of ten degrees.

The radii are intersected by a plurality of arcs 1 equally spaced from each other and parallel to the outer edge of the protractor, the arcs dividing the radii into a number of units. A second series of arcs are arranged between each pair of the first mentioned arcs and form subdivisions. I find it advantageous to divide the radii into ten units and each unit into ten subdivisions, but of course the number of units and number of divisions may be varied under different circumstances. Upon one of the arcs the numerals 5' indicating degrees are provided, the indication starting ten degrees in from each end and ranging to 80° upon the perpendicular.

The rule 6 is provided with a protractor 7 arranged upon one end and provided with the usual divisions indicating degrees. One edge 8 of the rule is divided into units and subdivisions equal in size to the units and subdivisions formed on the radii of the protractor. The zero point is advantageously arranged at the center of the protractor. The other edge 9 of the rule may be laid off in inches or in any other manner suitable to the user. I find it best to make the rule equal in length to the diameter of the protractor but under some circumstances the lengths may differ.

The instrument is used in the following manner: Given a right triangle BAC the side AC being 4.6 feet and the angle C being 50°, find the sides AB, BC and the angle B.

Upon one of the radii lay off the line AC 4.6 units in length. Draw the line AB perpendicular to the line AC and passing through the point A. Draw the line CB on the radii forming an angle of 50° with the line AC. The intersection of lines AB and CB form the triangle and by placing the rule upon the line AB with zero on the point B, the length of AB will be found to be 5.5 feet and at the same time the angle B can be read on the radii on the rule, the angle being 40°. The line CB which is 7.2 feet can be determined by the units and subdivisions on the radii.

Having a triangle GCF in which GC equals 5.4, or 54; FC equals 7.7 or 77; and angle C equals 93°; find the side GF and the angle F and the angle G. The lines GC and CF are laid off on the radii inclosing an angle of 93°. The line CG is then laid off 5.4 units in length and a line CF is plotted 7.7 units in length. A line is then drawn through the points G and F forming a triangle GCF. By placing the rule on the line FG with the zero at the point F the length of the line will be found to be 9.7 or 97, and at the same time the angle F may be read on the protractor carried by the rule and will be found to be 34°. The angle CGF which is 53° can either be measured with the protractor or obtained by subtracting the sum of the angle G and the angle F from 180.

From the foregoing it will be seen by the use of this instrument the sides and angles of a triangle may be determined by the simple means of plotting lines upon the protractor and measuring the lines and angles with the rule and the protractor carried by the rule. Although I have described the use of my invention in connection with a triangle it is to be understood that the instrument is capable of various uses in connection with polygons of all types.

What I claim is:—

1. As an article of manufacture a mathematical instrument comprising the combination of a rule and a protractor, said instrument being adapted to use in triangulation, the protractor having a series of radii extending from the center outward and indicating degrees, a series of arcs equally spaced from each other dividing said radii into units and a second series of arcs arranged between each pair of the first mentioned arcs and dividing said radii into subdivisions, the known quantities of the triangle being adapted to be plotted on said protractor and the triangle completed, the said rule being provided with units and subdivisions equal in size to the units and subdivisions of the protractor to measure the lengths of the unknown sides of the triangle by application thereto.

2. A combination as described in claim 1 wherein the length of said rule is equal to the diameter of the protractor.

3. A combination as described in claim 1 wherein one series of radii is provided to divide the protractor into units of a multiple of degrees, and a second set of radii so provided for dividing one of said units into smaller divisions.

Signed at New York, in the county of New York, and State of New York, this 9th day of May, A. D. 1916.

JOHN PURING.

Witnesses:
 ELEANOR E. WORSTER,
 ANNA D. McMAHON.